(12) United States Patent
Bishop et al.

(10) Patent No.: US 9,240,934 B2
(45) Date of Patent: Jan. 19, 2016

(54) MONITORING THE HEALTH OF A HOME AREA NETWORK

(71) Applicant: Landis+Gyr Innovations, Inc., Alpharetta, GA (US)

(72) Inventors: David Anthony Bishop, Woodstock, GA (US); James Paul Hartman, Canton, GA (US)

(73) Assignee: Landis+Gyr Innovations, Inc., Alpharetta, GA (US)

( * ) Notice: Subject to any disclaimer, the term of this patent is extended or adjusted under 35 U.S.C. 154(b) by 192 days.

(21) Appl. No.: 13/886,598

(22) Filed: May 3, 2013

(65) Prior Publication Data

US 2014/0330955 A1 Nov. 6, 2014

(51) Int. Cl.
- *G06F 15/173* (2006.01)
- *H04L 12/26* (2006.01)
- *H04L 12/24* (2006.01)
- *H04L 29/08* (2006.01)

(52) U.S. Cl.
CPC .......... *H04L 43/0823* (2013.01); *H04L 41/069* (2013.01); *H04L 43/0817* (2013.01); *H04L 67/00* (2013.01); *H04L 41/22* (2013.01)

(58) Field of Classification Search
CPC .............. H04W 28/04; H04L 43/0823; H04L 43/0817; H04L 67/00; H04L 41/22; H04L 41/069

See application file for complete search history.

(56) References Cited

U.S. PATENT DOCUMENTS

| | | | | |
|---|---|---|---|---|
| 8,761,050 B2 * | 6/2014 | Lu et al. | | 370/254 |
| 8,924,588 B2 * | 12/2014 | Petite | | 709/238 |
| 8,930,571 B2 * | 1/2015 | Petite | | 709/238 |
| 2008/0068217 A1 * | 3/2008 | Van Wyk et al. | | 340/870.11 |
| 2010/0045447 A1 * | 2/2010 | Mollenkopf et al. | | 340/310.11 |
| 2011/0098869 A1 * | 4/2011 | Seo et al. | | 700/296 |
| 2011/0109472 A1 * | 5/2011 | Spirakis et al. | | 340/870.02 |
| 2012/0036250 A1 * | 2/2012 | Vaswani et al. | | 709/224 |
| 2012/0158329 A1 * | 6/2012 | Hurri et al. | | 702/62 |
| 2012/0166642 A1 * | 6/2012 | Saint Clair et al. | | 709/225 |
| 2012/0209442 A1 * | 8/2012 | Ree | | 700/295 |
| 2012/0215370 A1 * | 8/2012 | Seo et al. | | 700/296 |
| 2012/0215725 A1 * | 8/2012 | Imes et al. | | 705/412 |
| 2013/0054044 A1 * | 2/2013 | Shaffer et al. | | 700/297 |
| 2013/0121157 A1 * | 5/2013 | Logvinov et al. | | 370/238 |
| 2013/0204444 A1 * | 8/2013 | Ahn et al. | | 700/286 |

(Continued)

*Primary Examiner* — Ario Etienne
*Assistant Examiner* — Andrea Hurst
(74) *Attorney, Agent, or Firm* — Kilpatrick Townsend & Stockton LLP

(57) ABSTRACT

Systems and methods are disclosed for monitoring the health of a home area network. An example system includes multiple devices communicatively coupled via a home area network and a gateway device communicatively coupled to the devices via the home area network. The home area network is configured for communicating information regarding a resource consumed at a geographical area serviced by the home area network. The gateway device includes a processor and a computer-readable medium. The processor can execute instructions embodied in the computer-readable medium to perform operations. The operations include monitoring communication metrics describing communications among the devices via the home area network. The operations also include monitoring application-level events generated by applications executed by the devices. The operations also include generating a status indicator for the home area network based on the communication metrics and the application-level events. The status indicator describes a health of the home area network.

17 Claims, 7 Drawing Sheets

(56) References Cited

U.S. PATENT DOCUMENTS

| | | | |
|---|---|---|---|
| 2013/0204448 A1* | 8/2013 | Lee et al. | 700/291 |
| 2013/0204449 A1* | 8/2013 | Ahn et al. | 700/291 |
| 2013/0229947 A1* | 9/2013 | Vaswani et al. | 370/254 |
| 2013/0261821 A1* | 10/2013 | Lu et al. | 700/289 |
| 2013/0262844 A1* | 10/2013 | Hester | 713/1 |
| 2013/0274938 A1* | 10/2013 | Ahn et al. | 700/291 |
| 2013/0314249 A1* | 11/2013 | Le Buhan et al. | 340/870.02 |
| 2013/0331997 A1* | 12/2013 | Ahn et al. | 700/286 |

* cited by examiner

Display Device 210

HAN Dashboard Application 212    ← 402

| | |
|---|---|
| Short ID | 1234 (0x04D2) |
| Manufacturer | Mfr_A |
| Device Type | IHD |
| Client Feature Set | Price, Metering, Messaging |
| Current Energy Price | Not Available |
| Hardware Version | Not Available |
| Firmware Version | Ver. 1.2.3v45678 |
| Networking Stack Version | Not Available |
| Power Source | DC Power Source |
| RSSSI of Last Message | -75 dBm |
| LQI of Last Message | 0x0F (raw value) |
| Time of Last APS Encrypted Message | 12/4/2012 9:19:43 |
| Time of Last NET Encrypted Message | 12/4/2012 13:23:03 |
| | |
| Log Events Received: | |
| 12/04/12 09:25:00: APS Key Authentication Attempt Failed | |
| 12/04/12 09:23:43: APS Message Decode Failed | |

FIG. 4

| HAN communication metrics | Performance | Weight | Contribution |
|---|---|---|---|
| % of msgs sent with no MAC retries | 100% | 25% | 25% |
| % of msgs sent with no APS retries | 100% | 25% | 25% |
| % of APS unicast success | 100% | 25% | 25% |
| % of MAC unicast success | 100% | 25% | 25% |
| | | Aggregate metric | 100% |
| | | HAN status indicator | Green |

FIG. 7

| Device communication metrics | Performance | Weight | Contribution |
|---|---|---|---|
| % load control participation | 85% | 20% | 17% |
| % key establishment success | 100% | 20% | 20% |
| % of successful APS message decryption | 100% | 20% | 20% |
| % of valid data reads | 85% | 20% | 17% |
| Time of last data poll | 100% | 20% | 20% |
| | | Aggregate metric | 94% |
| | | Device status indicator | Yellow |

FIG. 8

MONITORING THE HEALTH OF A HOME AREA NETWORK

TECHNICAL FIELD

This disclosure relates generally to networking and more particularly relates to monitoring the health of a home area network.

BACKGROUND

A home area network may be used to communicate information between devices that consume resources in a home or other dwelling (e.g., electricity) and devices that monitor and/or manage the consumption of resources. Utility companies and other resource providers may use home area networks to monitor consumption of the resources by consumers. Using home area networks to monitor consumption of the resources by consumers in a home may allow a utility company or other resource provider to identify distribution issues and other problems.

Previous solutions for providing home area networks may lack metrics or other information for measuring the performance of home area networks and/or resolving malfunctions in home area networks. Accordingly, systems and methods are desirable for monitoring the health of a home area network.

SUMMARY

Systems and methods are disclosed for monitoring the health of a home area network. An example system includes multiple devices communicatively coupled via a home area network and a gateway device communicatively coupled to the devices via the home area network. The home area network is configured for communicating information regarding a resource consumed at a geographical area serviced by the home area network. The gateway device includes a processor and a non-transitory computer-readable medium. The processor is configured for executing instructions embodied in the non-transitory computer-readable medium to perform operations. The operations include monitoring communication metrics describing communications among the devices via the home area network. The operations also include monitoring application-level events generated by applications executed by at least some of the devices. The operations also include generating a status indicator for the home area network based on the communication metrics and the application-level events. The status indicator describes the health of the home area network.

These illustrative aspects and features are mentioned not to limit or define the invention, but to provide examples to aid understanding of the inventive concepts disclosed in this application. Other aspects, advantages, and features of the present invention will become apparent after review of the entire application.

BRIEF DESCRIPTION OF THE FIGURES

These and other features, aspects, and advantages of the present disclosure are better understood when the following Detailed Description is read with reference to the accompanying drawings, where:

FIG. 4 is a diagram illustrating an example graphical interface for obtaining status details for a device of a HAN via the HAN dashboard application;

FIG. 7 is a table depicting an example chart for generating a status indicator for a HAN based on communication attributes of the HAN; and FIG. 8 is a table depicting an example chart for generating a status indicator for a HAN device based on attributes of the HAN device.

DETAILED DESCRIPTION

Figure 1:
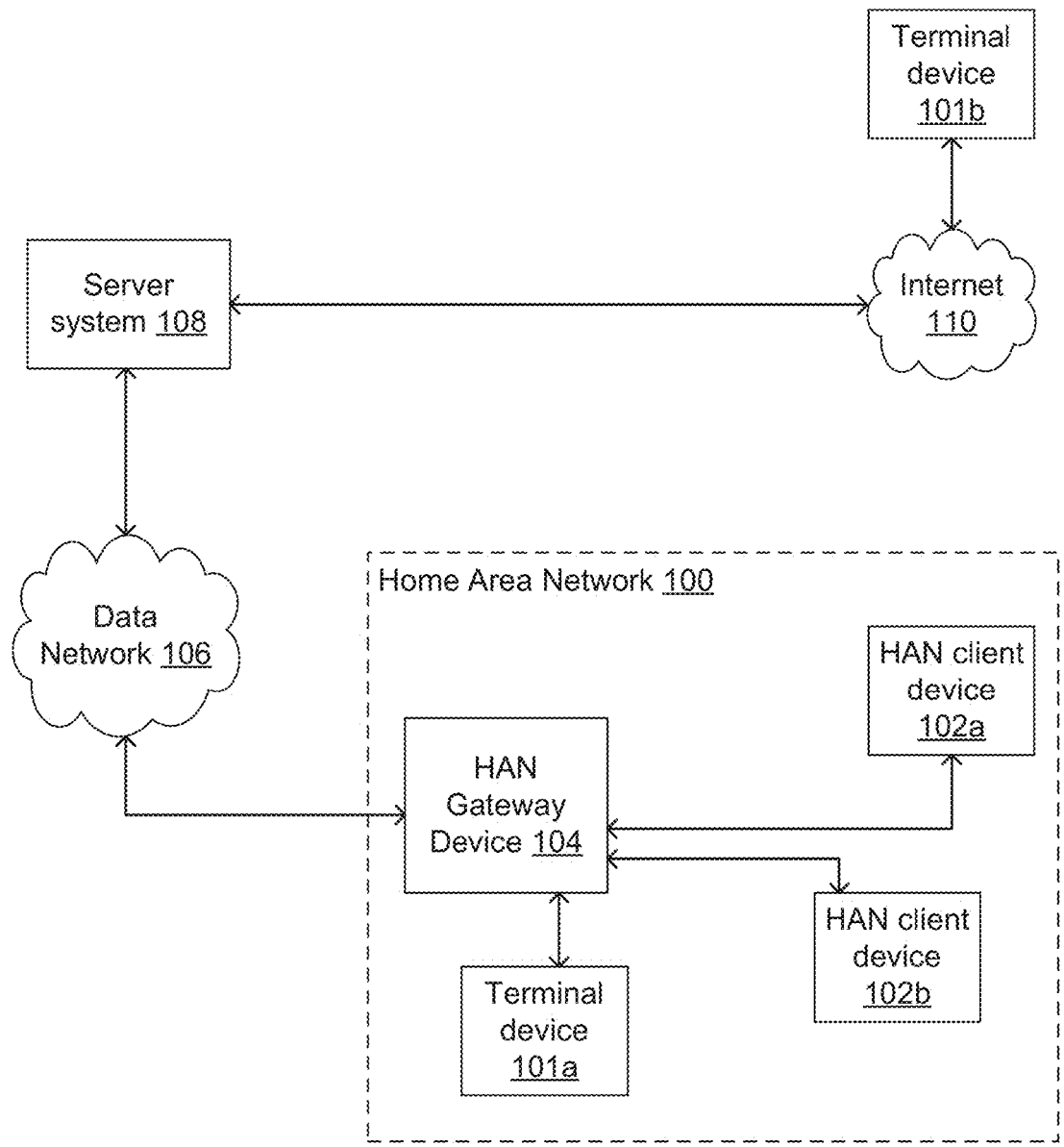
FIG. 1 is a network diagram illustrating an example home area network that can be monitored via a home area network ("HAN") dashboard application.

Systems and methods are provided for monitoring the health of a home area network ("HAN"), via a HAN dashboard application or other suitable application. The health of the HAN can include performance measures for the applications executed on devices accessing the HAN and or communication among device via the HAN. The HAN dashboard application or other suitable application can provide metrics for monitoring, measuring, and troubleshooting network performance for a HAN. The HAN dashboard application or other suitable application can facilitate aggregating and displaying network performance data either locally or across large networks. Aggregated network performance data can be used to identify malfunctions in a HAN, analyze root causes for the malfunctions, and develop solutions for the malfunctions.

In an exemplary system, multiple devices can communicate via a HAN. For example, a HAN can communicatively link multiple devices associated with a power distribution system in a dwelling, a structure, or other suitable geographical area. The HAN can be configured for communicating information regarding electricity or another resource consumed in a dwelling, structure, or other geographical area serviced by the home area network. A HAN dashboard application and/or other suitable application can monitor metrics and other events indicative of the health of the HAN. For example, the HAN dashboard application can monitor communication metrics describing communication among the devices via the HAN. Non-limiting examples of communication metrics describing communication via the HAN include respective connection states for the devices, a number of broadcast messages and/or a number of unicast messages communicated via the HAN, a number of unicast retries and/or failures communicated via the HAN, and the like. The HAN dashboard application can also monitor application-level events generated by the devices. For example, an application-level event can be generated by an application executed at a device for monitoring one or more features of the power distribution system. Non-limiting examples of application-level events include times of use for one or more of the devices, the reliability of data associated with features of the power distribution system, a number of authentication failures experienced by one or more of the applications, hardware-level communications between components of a device, and the like. The HAN dashboard application can generate a network status indicator based on the communication metrics and application-level events. The status indicator describes the health or other status of the HAN. A status indicator can use color coding (e.g., green, yellow, or red) and/or other visual indicators to depict the health of the HAN. Non-limiting examples of application-level events include a current price for a resource being consumed, a time of a next price change for a resource being consumed, a time of last price change, a device state (e.g., "Provisioned," "Joined," "Discovery Incomplete," "Normal," "Trouble"), a time of last response to a load control action, a current usage of the resource (e.g., kilowatts (kW) of power being consumed), a current thermostat setting point, etc.

As used herein, the term "home area network" is used to refer to a data network providing communication channels between devices positioned in a dwelling or other residential structure. A HAN can include a smaller number of network devices (e.g., personal computers, mobile computing devices, etc.) than larger data networks such as a local area network or a wide area network. In some aspects, a HAN can include low-power network devices that can wirelessly communicate with other devices in the HAN. A HAN can be implemented using any suitable networking protocol. Non-limiting examples of suitable networking protocols for implementing a HAN include ZigBee, Bluetooth, Wi-Fi, and the like. Non-limiting examples of a HAN include a HomePlug network implemented via power line communications, a Multimedia over Coax Alliance ("MoCA") network providing network connectivity between appliances and networking devices implemented via coaxial cable, a HomePNA Alliance network, etc.

As used herein, the term "data network" is used to refer to a group of devices interconnected by communication channels that allow sharing of information. A communication channel can include any suitable means for communicating data over a network, such as (but not limited to) a copper cable, a fiber optic cable, a wireless transmission, etc.

As used herein, the term "health of the HAN" is used to refer to one or more performance measures for the applications executed on the devices accessing a HAN and/or the communication among devices via the HAN. The performance measures can include (but are not limited to) a degree to which the applications are operating in an intended manner and a degree to which the devices are reliably and accurately communicating with one another. The health of the HAN can indicate the degree to which devices accessing the network are providing a desired function.

As used herein, the term "power distribution system" is used to refer to a group of devices, systems, and/or other suitable infrastructure for transferring power from a power source, such as a power plant, to one or more end users or geographical locations, such as a dwelling, structure, or other geographical area.

As used herein, the term "device" is used to refer to any device capable of communicating with other devices via a HAN or other data network. In some aspects, a device can include a processing device configured to execute software performing one or more applications related to managing, monitoring, or otherwise using information regarding one or more attributes of a power distribution system associated with the HAN. Non-limiting examples of such devices include an intelligent metering device for monitoring and analyzing power consumption, a programmable thermostat for managing power consumption, an in-home display device for displaying information related to power consumption and associated billing information for the power consumption, and the like. In additional or alternative aspects, a device can include a network interface device for communicating with the HAN and one or more components that consume power to perform one or more mechanical or other functions in addition to analyzing, monitoring, displaying, or otherwise using data communicated via the HAN. Non-limiting examples of such devices include a water heater having a metering device communicatively coupled to the HAN, a pool pump having a metering device communicatively coupled to the HAN, and the like. In some aspects, such devices can include integrated metering devices and/or other network interface devices for communicating via the HAN. In other aspects, such devices can include auxiliary metering devices and/or other network interface devices that are communicatively coupled to the device.

The metrics for monitoring HAN network performance can be collected and/or aggregated by any suitable computing device or system. For example, communication metrics and/or status metrics can be gathered by one or more devices on the HAN. In some aspects, the communication metrics and/or status metrics can be provided to a server system or other head-end system used to manage power distribution to a structure or other geographical area serviced by a HAN. The communication metrics and/or status metrics can be provided to the server system or other head-end system via any suitable communication medium. In one non-limiting example, communication metrics and/or status metrics can be communicated to a management application executed on a server system or other head-end system via an RF mesh network or a power line communication ("PLC") network. The head-end system can receive the communication metrics and/or status metrics via a gateway device residing on the HAN and/or in communication with the HAN. In other aspects, the metrics for monitoring HAN network performance can be collected and/or aggregated by a device such as an intelligent metering device or other HAN gateway device for display to a consumer via an in-home display device.

A HAN dashboard application or other suitable application can aggregate data related to a HAN and provide the data in a format usable for a system operator, a technician, a consumer, or other end user. For example, the HAN dashboard application can provide a graphical interface depicting one or more HAN status indicators. The graphical interface can be provided for display at a computing device accessible via the HAN and/or a computing device accessible via a data network external to the HAN. In some aspects, the graphical interface can provide device-level indicators for each of the devices in the HAN. A device-level indicator identifies a contribution of the device to the network status indicator describing the health of the HAN. The graphical interface may additionally or alternative provide a respective device profile for each device communicatively coupled to the HAN. A device profile can identify at least one hardware characteristic of the device and at least one software characteristic for software executed at the device. Non-limiting examples of a hardware characteristic include a device type, a manufacturer of the device, a hardware version for one or more components of the device, a power source for the device, and the like. Non-limiting examples of a software characteristic include a firmware version, a device identifier, a networking stack version, a software version for an application executed at the device, and the like.

The graphical interface can provide one or more views for monitoring the network performance of the HAN. One non-limiting example of a view used for monitoring the network performance of the HAN is a "home" view. The "home" view can provide information to a consumer regarding the health, performance, or other status of a HAN servicing the consumer's home. The "home" view may provide a summary view of the health of the HAN. Another non-limiting example of a view used for monitoring the network performance of the HAN is a "multiple-dwelling" view. The "multiple-dwelling" view can provide status indicators for a multi-dwelling unit, such as an apartment complex. The status indicators can be generated based on aggregated statistics from multiple HANs respectively servicing different dwellings in the multi-dwelling unit. The "multiple-dwelling" view can provide status indicators in a single consolidated view. For example, the "multiple-dwelling" view may include a grid of thumbnails depicting identifiers for each individual HAN and a status indicator for each individual HAN. The graphical interface may be configured to provide a detailed set of status indicators for devices on a given HAN in response to an input selecting a given thumbnail. Another non-limiting example of a view used for monitoring the network performance of the HAN is a "head-end" view for a power distribution system encompassing multiple structures or larger geographical areas.

These illustrative examples are given to introduce the reader to the general subject matter discussed here and are not intended to limit the scope of the disclosed concepts. The following sections describe various additional aspects and examples with reference to the drawings in which like numerals indicate like elements.

The features discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general-purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Referring now to the drawings, FIG. 1 is a network diagram illustrating an example HAN 100 that can be monitored via a HAN dashboard application. The HAN 100 can include HAN client devices 102a, 102b and a HAN gateway device 104.

The HAN client devices 102a, 102b can include devices used to perform functions and/or execute software applications related to a common system, purpose, application, function, etc. For example, the HAN 100 can include devices that consume power or other resources provided by a power distribution network or other resource provider to a dwelling serviced by the HAN 100. The HAN 100 can also include devices executing applications for monitoring and/or managing the power or other resource to the dwelling. One or more of the HAN client devices 102a, 102b may be a device that consumes power to perform one or more mechanical functions or other functions in addition to analyzing, monitoring, displaying, or otherwise using data communicated via the HAN 100. Non-liming examples of such devices include devices that consume power to perform one or more mechanical functions in a dwelling or other structure serviced by the HAN 100, such as (but not limited to) a water heater, a pool pump, an air conditioner, etc. Devices that consume power can include or be communicatively coupled to sensing devices or other metering devices for monitoring power consumption and/or network devices for accessing the HAN 100. Devices such as pool pumps, water heaters, smart appliances, irrigation pumps, lighting devices, generation systems, etc. can communicate data regarding one or more attributes related to resource consumption by a dwelling, structure, and/or other geographical area serviced by a HAN 100. Non-limiting examples of data regarding one or more attributes related to resource consumption include: instantaneous demand on a grid or other power distribution system; a duty cycle; an average usage over a suitable interval such as (but not limited to) a day, a week, a month, etc.; a minimum and/or maximum demand over a suitable interval such as (but not limited to) a day, a week, a month, etc.; one or more mode settings such as (but not limited to) a conservation mode for reducing the rate of resource consumption, an on/off timer mode, a heating/cooling mode, actions performed responsive to pricing for the consumed resource, a time-of-use level, and/or some combination thereof. One or more of the HAN client devices 102a, 102b may additionally or alternatively be a device dedicated to analyzing, monitoring, displaying, or otherwise using data communicated via the HAN 100. Non-limiting examples of such devices include devices that display information related to power consumption (such as a display device displaying a projected cost based on the current power consumption) and/or devices configured for managing power consumption (e.g., a programmable thermostat).

The HAN gateway device 104 can include any suitable computing device configured to communicate data between the HAN 100 and a data network 106 separate from the HAN 100. The HAN gateway device 104 can store metrics regarding the health of the HAN 100. The HAN gateway device 104 can communicate the metrics to a server system 108. A non-limiting example of a server system 108 is a head-end system for a power distribution network that provides power to a dwelling, structure, or other geographical area serviced by the HAN 100. A non-limiting example of a HAN gateway device 104 is an intelligent metering device for a power distribution network or other resource provider and/or another network interface device connected to the intelligent metering device. An intelligent metering device can include one or more metering components communicatively coupled to the processor 214. The processor can use readings from the metering components to monitor the consumption of power or other resources at a structure or other geographical area serviced by the HAN 100.

The data network 106 can provide a communication channel between the HAN gateway device 104 and the server system 108. A communication channel can include any suitable means capable of communicating signals between the HAN gateway device 104 and the server system 108. Examples of suitable communication media include (but are not limited to) Ethernet cable, wireless data communication, power cables for use in power line communication ("PLC"), etc. Power line communication can include communicating signals via cables used for providing electric power from a utility company to buildings in a geographic area. The data network 106 can be configured using any suitable network topology, such as (but not limited to) a mesh network, a ring network, a star network, a bus network, etc.

FIG. 1 also depicts terminal devices 101a, 101b. Each of the terminal devices 101a, 101b can include any suitable computing device configured for accessing and displaying a HAN dashboard application or other suitable application for monitoring the HAN. In some aspects, one or more of the terminal devices 101a, 101b can access metrics via the HAN 100 for display via a HAN dashboard application. For example, as depicted in FIG. 1, the terminal device 101a can communicate with the HAN gateway device 104 via the HAN to obtain metrics describing the health of the HAN 100. In additional or alternative aspects, one or more of the terminal devices 101a, 101b can access metrics via an external data network (e.g., the data network 106 or the internet 110) for display via a HAN dashboard application. For example, as depicted in FIG. 1, the terminal device 101b can communicate with the server system 108 via the internet 110 to obtain metrics describing the health of the HAN 100.

Although FIG. 1 depicts a terminal device 101a communicating via the HAN 100 and the terminal device 101b communicating via the internet 110, other implementations are possible. Any number of terminal devices (including one) can access metrics for display via a HAN dashboard application.

Figure 2:
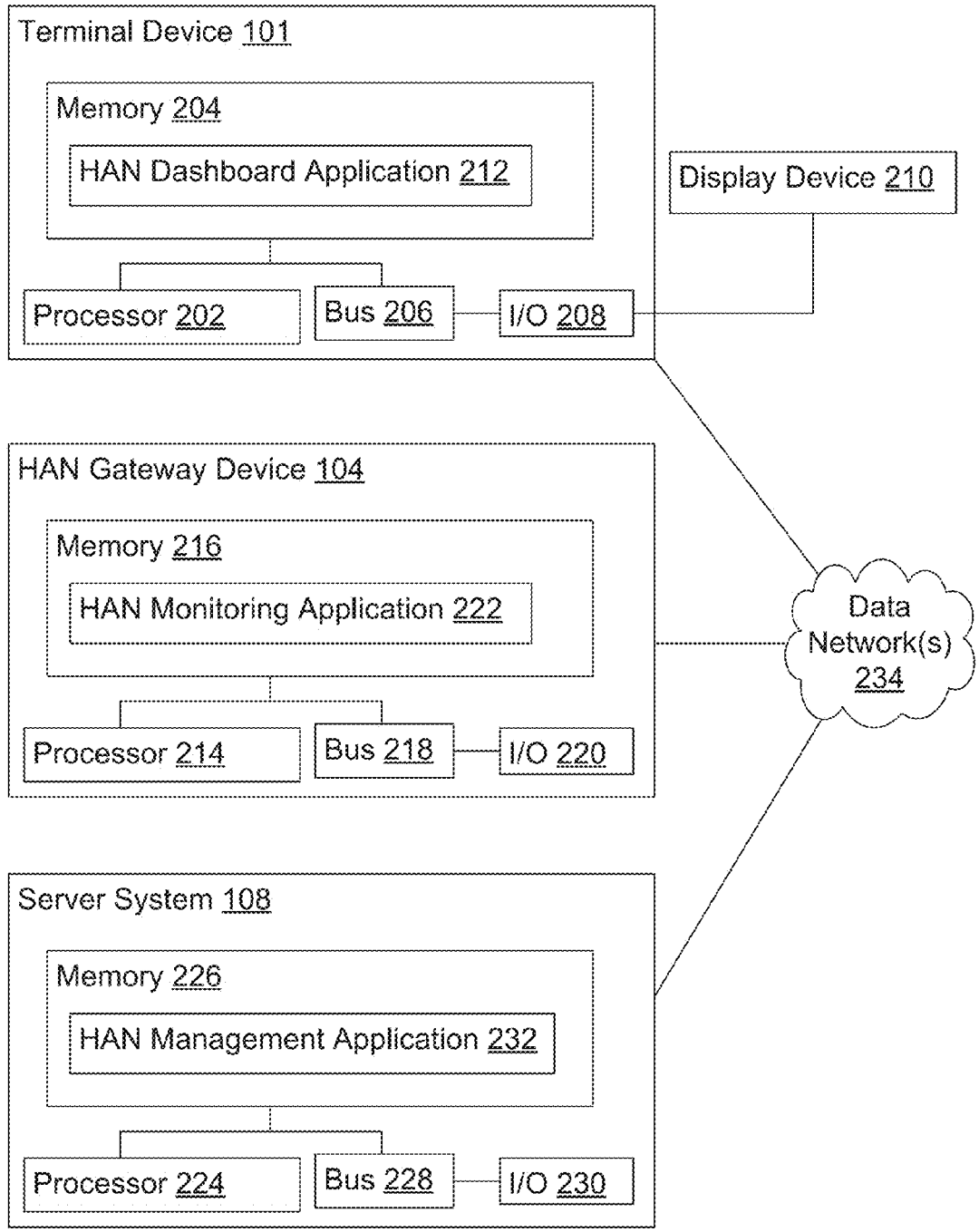
FIG. 2 is a network diagram illustrating example computing devices for implementing HAN monitoring features.

FIG. 2 is a block diagram illustrating example computing devices for implementing HAN monitoring features. The example computing systems include a terminal device 101, HAN gateway device 104, and a server system 108 in communication via one or more data network(s) 234. Non-limiting examples of the data network(s) 234 include the HAN 100, the data network 106, the internet 110, and/or some combination of the HAN 100, the data network 106, and/or the internet 110.

The terminal device 101, the HAN gateway device 104, and the server system 108 respectively include processors 202, 214, 224. Non-limiting examples of processors 202, 214, 224 include a microprocessor, an application-specific integrated circuit ("ASIC"), a state machine, or other suitable processing device. Each of the processors 202, 214, 224 can include any number of computer processing devices, including one. The processors 202, 214, 224 can be communicatively coupled to a computer-readable medium, such as memories 204, 216, 226. The processors 202, 214, 224 can execute computer-executable program instructions and/or accesses information respectively stored in the memories 204, 216, 226.

Each of the memories 204, 216, 226 can store instructions that, when executed by the processors 202, 214, 224, cause a respective one of the processors 202, 214, 224 to perform operations described herein. Each of the memories 204, 216, 226 may be a computer-readable medium such as (but not limited to) an electronic, optical, magnetic, or other storage device capable of providing a processor with computer-readable instructions. Non-limiting examples of such optical, magnetic, or other storage devices include read-only ("ROM") device(s), random-access memory ("RAM") device(s), magnetic disk(s), magnetic tape(s) or other magnetic storage, memory chip(s), an ASIC, configured processor(s), optical storage device(s), or any other medium from which a computer processor can read instructions. The instructions may comprise processor-specific instructions generated by a compiler and/or an interpreter from code written in any suitable computer-programming language. Non-limiting examples of suitable computer-programming languages include C, C++, C#, Visual Basic, Java, Python, Perl, JavaScript, ActionScript, and the like.

The terminal device 101, the HAN gateway device 104, and the server system 108 respectively include buses 206, 218, 228. Each of the buses 206, 218, 228 can communicatively couple one or more components of a respective one of the terminal device 101, the HAN gateway device 104, and server system 108.

The terminal device 101, the HAN gateway device 104, and the server system 108 may also include a number of external or internal devices, such as input or output devices. For example, the terminal device 101, the HAN gateway device 104, and the server system 108 are depicted with input/output ("I/O") interfaces 208, 220, 230, respectively. The I/O interfaces 208, 220, 230 are configured for receiving input from input devices and/or providing output to output devices.

FIG. 2 also illustrates a HAN dashboard application 212 comprised in the memory 204 of the terminal device 101. The HAN dashboard application 212 can configure the processor 202 to render one or more graphical interfaces via a display device 210. The graphical interfaces displayed via a display device 210 can provide information regarding the health of the HAN 100, as described in detail below with respect to FIGS. 3-5.

The HAN dashboard application 212 can be used to monitor, troubleshoot, or otherwise obtain information about a HAN 100. The HAN dashboard application 212 can be used by any suitable entity or end user. In one non-limiting example, a customer of a power distribution company or other utility company can use a "home" view of a HAN dashboard application 212 to monitor the health of a HAN 100 servicing a dwelling or other structure in which the customer resides. In another non-limiting example, a building manager for a multi-dwelling unit serviced by a power distribution company or other utility company can use a "multi-dwelling" view of a HAN dashboard application 212 to monitor the health of one or more HANs 100 servicing the dwellings of the multi-dwelling unit in which tenants of the multi-dwelling unit reside. In another non-limiting example, a power distribution company or other utility company can use a HAN dashboard application 212 to monitor, troubleshoot, and/or otherwise manage HANs 100 for structures or other geographical areas serviced by the power distribution company or other utility company. For example, customer service representatives may use the HAN dashboard application 212 to assist customers in ensuring the proper functionality and operation of one or more HAN client devices 102a, 102b in the HAN 100. The power distribution company or other utility company can collect data regarding different HANs 100 into an operational data store that can be used to identify trends in usage, performance, and trouble management over time.

One or more of the HAN dashboard application 212, the HAN monitoring application 222, and/or the HAN management application 232 can monitor, collect, and/or analyze metrics to generate a status indicator for the HAN 100 and/or the HAN client devices 102a, 102b. For example, the HAN monitoring application 222 can obtain metrics regarding application-level events and communication metrics, aggregate the metrics regarding application-level events and communication metrics, and provide the aggregated metrics to the HAN management application 232. The aggregation and transmittal of the metrics regarding application-level events and communication metrics can be performed according to a schedule. The HAN monitoring application 222 can also perform one or more analyses using the application-level events and/or the communication metrics. The HAN monitoring application 222 can generate alarm messages or other communications based on the analyses and provide the alarm messages or other communications to the HAN management application 232. The alarm messages or other communications can be used to avoid an impending malfunctions or other problems in the HAN 100. The HAN dashboard application 212 can analyze and/or interpret metrics obtained from the HAN monitoring application 222 and/or the HAN management application 232. For example, the HAN dashboard application 212 can generate information regarding power consumption or other resource consumption such as (but not limited to) daily communication trends, load curtailment participation audits vs. enrollment, in-home usage trends per device, etc.

The terminal device 101 can include any suitable computing device or system for executing the HAN dashboard application 212 and communicating with the HAN gateway device 104 and/or the server system 108 via one or more of the data networks 234. Non-limiting examples of a suitable computing device or system include a desktop computer, a tablet computer, a smartphone, or any other computing device or system suitable for using electronic content.

FIG. 2 also illustrates a HAN monitoring application 222 comprised in the memory 216 of the HAN gateway device 104 and a HAN management application 232 comprised in the memory 226 of the server system 108. The HAN monitoring application 222 can configure the processor 214 to monitor, request, or otherwise obtain metrics and/or other information from HAN client device 102a, 102b. The HAN monitoring application 222 can collect metrics and/or other data describing one or more metrics of the HAN. The HAN management application 232 can configure the processor 224 to monitor, request, or otherwise obtain metrics and/or other information from the HAN gateway device 104. The HAN monitoring application 222 can communicate the metrics and/or other data to the HAN management application 232 executed at the server system 108 via one or more of the data networks 234. The HAN monitoring application 222 can provide the metrics and/or other information to the HAN dashboard application 212 via one or more of the data networks 234.

The HAN management application 232 can determine a status for the HAN 100 based on the metrics. In some aspects, the HAN management application 232 can determine the status in response to a request for the status of the HAN 100 from an instance of the HAN dashboard application 212. In other aspects, the HAN management application 232 can determine the status without a request for the status of the HAN 100 from an instance of the HAN dashboard application 212. The HAN management application 232 can generate and transmit an alarm message to one or more management entities (such as, but not limited to, automated management systems and/or personnel responsible for responding to system malfunctions) in response to determining a status indicative of a malfunction of the HAN 100. For example, the HAN management application 232 can interface with external systems, such as one or more systems hosting a mobile device management application or other application.

In additional or alternative aspects, the HAN management application 232 or a user of the HAN management application 232 can identify one or more malfunctions in a HAN 100 based on one or more status indicators provided by the HAN gateway device 104. The HAN management application 232 can generate a control signal or other message. The control signal or other message can include instructions or other data usable by the HAN gateway device 104 to resolve a malfunction. For example, a control signal can include an instruction to the HAN gateway device 104 to push updated software or data to one or more of the HAN client devices 102a, 102b. The server system 108 can transmit the control signal or other message to the HAN gateway device 104 via the data network 106.

A status indicator (such as a "Red", "Yellow, or "Green" status) can be determined by one or more of the HAN dashboard application 212, the HAN monitoring application 222, the HAN management application 232, or some combination thereof.

The server system 108 can include any suitable computing system for hosting the HAN management application 232. In some aspects, the server system 108 may be a single computing system. In other aspects, the server system 108 may be a virtual server implemented using a number of computing systems connected in a grid or cloud computing topology.

Figure 3:
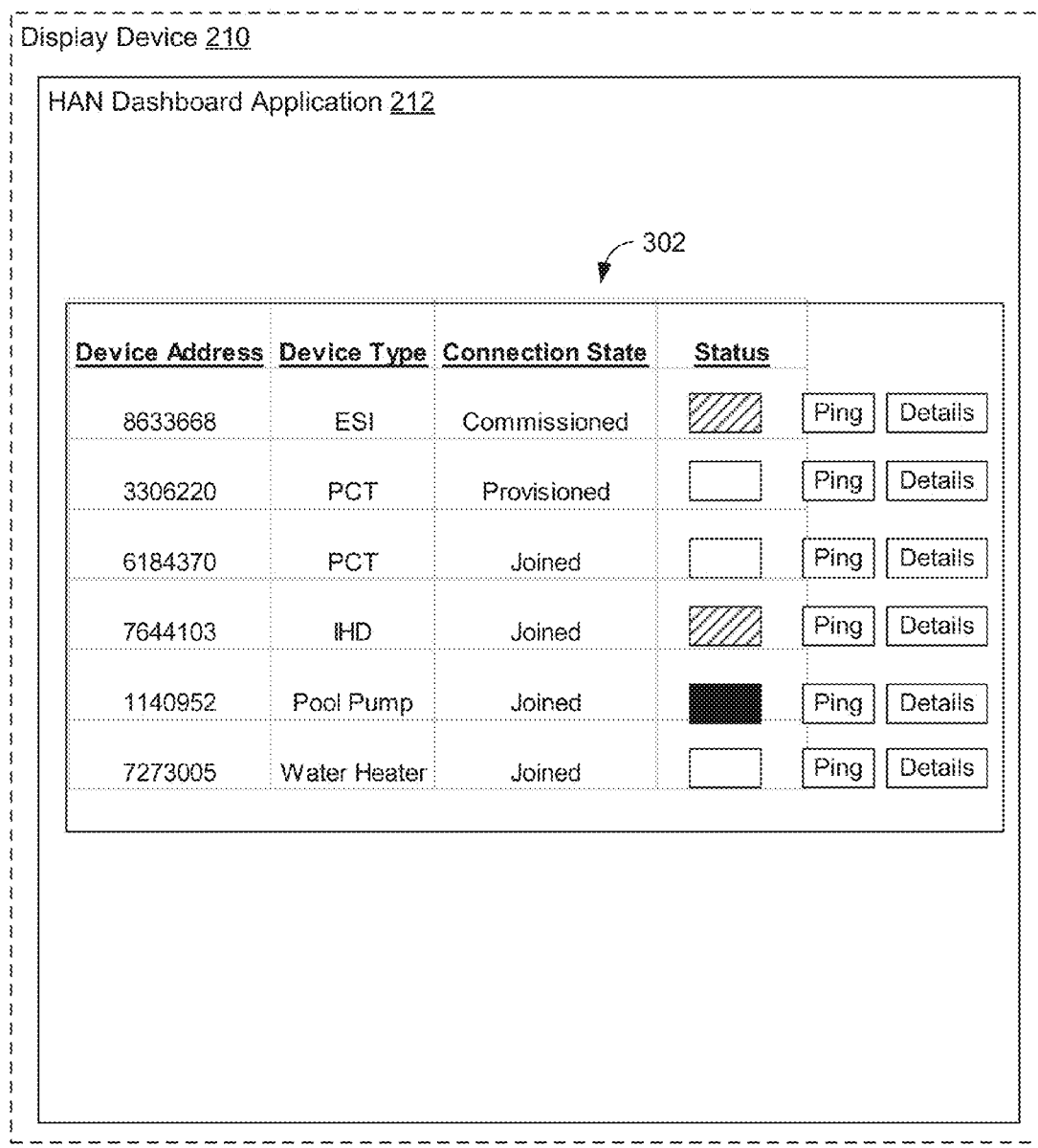
FIG. 3 is a diagram illustrating an example graphical interface for obtaining a status for each device of a HAN via a HAN dashboard application.

The HAN dashboard application 212 can aggregate metrics and/or other data related to the HAN 100. The HAN dashboard application 212 can provide the aggregated data in a format usable for a technician or a consumer via a graphical interface. For example, FIG. 3 is a diagram illustrating an example graphical interface 302 for obtaining a status for each device of a HAN 100 via a HAN dashboard application 212.

The graphical interface 302 can use status indicators to depict statuses for each of multiple HANs serviced by a power distribution system. For example, the status indicators can include a "green" status indicating a satisfactory performance (e.g., an absence of malfunctions), a "yellow" status indicating a presence of one or more malfunctions or other reduced performance, and a "red" status indicating one or more malfunctions severely impacting operation of a given HAN. The status indicators can be generated based on application-level events generated by one or more of the HAN client devices 102a, 102b and/or communication metrics describing communication between the HAN client devices 102a, 102b via the HAN 100. For example, a given application-level event can be generated by an application executed at one of the HAN client devices 102a, 102b that is related to the consumption of power provided by a power distribution system to a structure or other geographical area serviced by the HAN 100. Non-limiting examples of application-level events include times of use for one or more of the HAN client devices 102a, 102b, refresh times for retrieving data associated with features of the power distribution system, a number of authentication failures experienced by one or more of the applications executed at one or more of the HAN client devices 102a, 102b, hardware level communications in one or more of the HAN client devices 102a, 102b (e.g., a most recent date and time during which a successful communication time between a processor in a device and another component of the device), and the like. Non-limiting examples of metrics describing communication via the HAN 100 include respective connection states for the HAN client devices 102a, 102b, number of broadcast and/or unicast messages communicated via the HAN 100, a number of unicast retries and/or failures communicated via the HAN 100, and the like.

The graphical interface 302 can identify one or more devices accessing the HAN 100. For example, as depicted in FIG. 3, a graphical interface 302 can identify devices that consume, monitor, manage, and/or are otherwise associated with power provided by a power distribution system to a structure or other area serviced by the HAN 100. The graphical interface 302 identifies an intelligent metering device providing an energy services interface (indicated by "ESI" in FIG. 3), a programmable communicating thermostat (indicated by "PCT" in FIG. 3) for controlling power usage in an area serviced by the HAN 100, an in-home display device (indicated by "IHD" in FIG. 3) providing an in-home display of power management information for devices of the HAN 100, a pool pump being monitored using the HAN 100, and a water heater being monitored using the HAN 100.

The graphical interface 302 can also include a connection state for each of the devices. For example, as depicted in FIG. 3, each device has a connection state such as "commissioned," "joined," and "provisioned." A "commissioned" connection state can indicate that a management device, such as the intelligent metering device, is configured to monitor and/or manage other devices via the HAN 100. A "joined" connection state can indicate that the device can communicate via the network and that the device can be managed by a management device, such as a HAN gateway device 104 and/or a server system 108. A "provisioned" connection state can indicate that a message has been transmitted to the device inviting the device to join the HAN 100 and that the device has not yet joined the HAN 100.

The graphical interface 302 can also include an operational status for each of the devices. In some aspects, the operational status can be indicated by visual indicators corresponding to different patterns, such as the solid darkened pattern, the hatched pattern, and the solid white pattern depicted in FIG. 3. The operational status can be indicated by different patterns based on the graphical interface 302 being rendered for display on a display device 210 without a capability to render different colors. In other aspects, the operational status can be indicated by a color scheme (such as red, yellow, and green) or by different patterns. The operational status can be indicated by different colors based on the graphical interface 302 being rendered for display on a display device 210 with the capability to render different colors.

Figure 5:
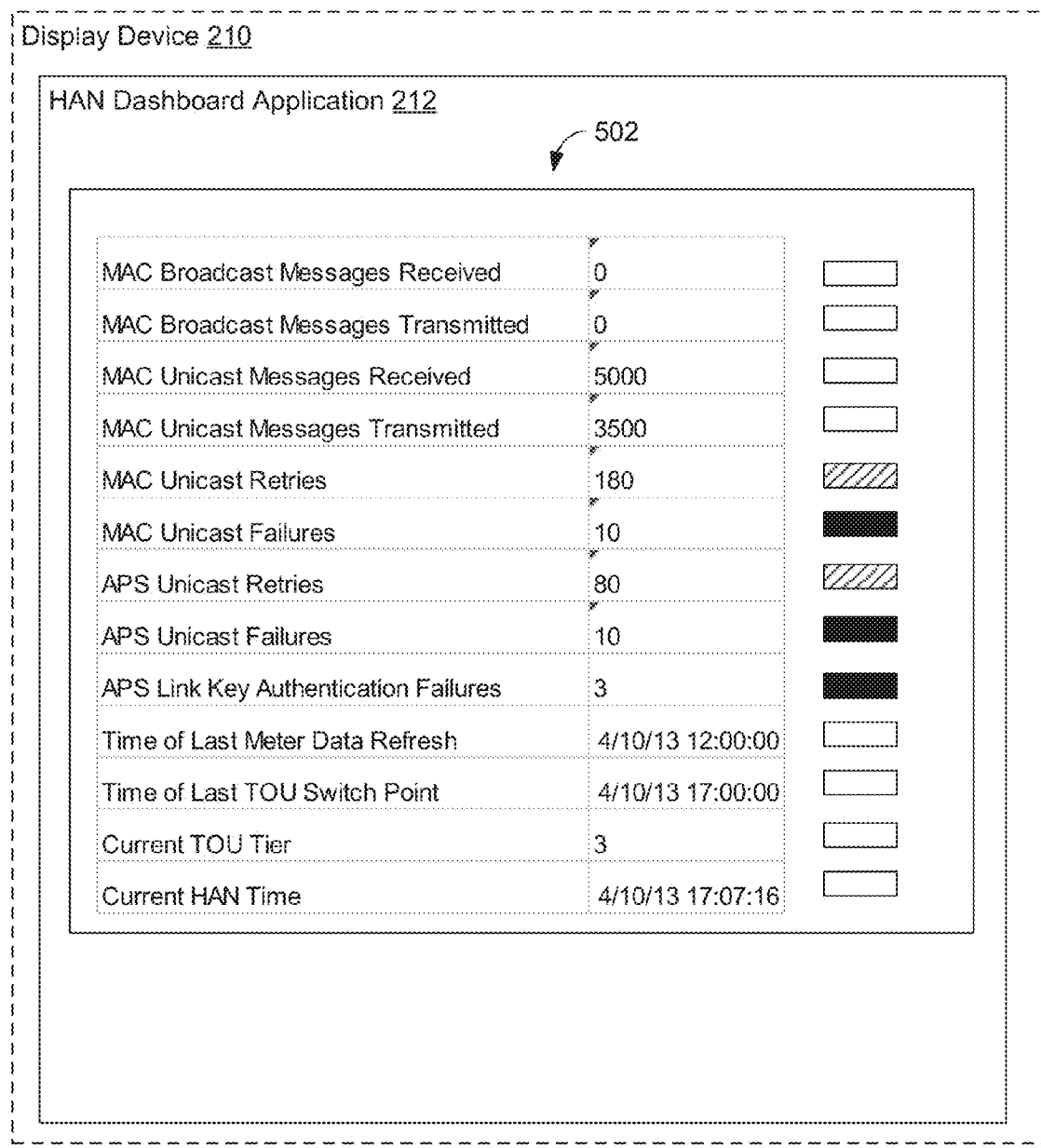
FIG. 5 is a diagram illustrating another example graphical interface for obtaining status details for a device of a HAN via the HAN dashboard application.

Selecting a status indicator in the graphical interface 302 can cause one or more additional graphical interfaces to be provided. The additional graphical interface can include one or more values for one or more of the metrics used to generate the status for the selected HAN. For example, FIGS. 4 and 5 are diagrams illustrating example graphical interfaces 402, 502 for obtaining status details for one of the HAN client devices 102a, 102b via the HAN dashboard application 212.

The HAN dashboard application 212 can determine the health of a HAN 100 and/or obtain the health of a HAN 100 determined by the HAN management application 232 based on metrics or other data specific to the HAN 100. The metrics specific to the HAN can be used to determine whether the applications communicating via the HAN 100 and/or HAN client devices 102a, 102b are operating in a desired manner. For example, the graphical interface 402 can display hardware characteristics of one of the HAN client devices 102a, 102b and/or software characteristics associated with one of the HAN client devices 102a, 102b. Non-limiting examples of a hardware characteristic include a device type, a manufacturer of the device, a hardware version for one or more components of the device, a power source for the device, and the like. Non-limiting examples of a software characteristic include a firmware version, a device identifier, a networking stack version, and the like.

One example of a metric specific to a HAN is a time at which data stored at a HAN gateway device 104 is refreshed. For example, a HAN gateway device 104 such as an intelligent metering device can communicate with HAN client devices 102a, 102b. An example of a HAN client device 102a is an in-home display device or other suitable computing device that is configured to display information regarding power usage in a structure and/or other geographical area serviced by the HAN 100. The intelligent metering device can provide data to the HAN client devices 102a, 102b. The HAN dashboard application 212 and/or the HAN management application 232 can compare a current time to a time at which data stored at one of the HAN client devices 102a, 102b was refreshed. The HAN dashboard application 212 and/or the HAN management application 232 can determine a duration since the most recent refresh of the data based on comparing the current time to the time at which the stored data was refreshed. The HAN dashboard application 212 can and/or the HAN management application 232 determine that a malfunction is present based on the duration exceeding a threshold duration. For example, the HAN dashboard application 212 and/or the HAN management application 232 can compare the current time-of-use tier with a known time-of-use schedule for the intelligent metering device. The HAN dashboard application 212 and/or the HAN management application 232 can generate a malfunction status indicator for display in the graphical interface 302 based on determining that the current time-of-use tier is different from the known time-of-use schedule.

The HAN dashboard application 212 can also determine the health of a HAN 100 based on network communication metrics. For example, the graphical interface 502 can display one or more network communication metrics for one of the HAN client devices 102a, 102b. The network communication metrics can be used to determine whether the HAN client devices 102a, 102b can successfully and reliably communicate via the HAN 100. Non-limiting examples of network communication metrics include MAC level retries, APS retries, link key authorization, link key authorization failures, and the like.

In some aspects, the network metrics can be generated based on a configurable threshold number of network communication events in a given category over a configurable threshold duration. The number of network communication events over a given interval of time can be used to determine a network communication status based on the threshold number of network communication events over the threshold duration. Non-limiting examples of network communication events include a number of broadcast messages communicated via the HAN 100, a number of unicast messages communicated via the HAN 100, a number of unicast retries communicated via the HAN, a number of unicast failures for the HAN 100, and the like. For example, a number of unicast retries that exceeds 100 retries over a period of 24 hours can indicate a malfunction for the network communication status of the device.

Different metrics can be weighted differently by the HAN dashboard application 212 in generating an operational status. For example, malfunctions related to application data stored on a device may be treated as a minor malfunction for the HAN (e.g., a "yellow" status), and malfunctions related to network communication may be treated as a severe malfunction for the HAN (e.g., a "red" status).

One or more of the graphical interfaces 302, 402, 502 provided by the HAN dashboard application 212 can be used to troubleshoot malfunctions in the HAN 100. In a non-limiting example, a system operator accessing the graphical interface 302 can note that the operational status indicator for the "IHD" entry corresponding to an in-home display device has a hatched pattern (or, for a color display device 210, a yellow color). The hatched pattern may indicate that the in-home display device is experiencing a malfunction or other measure of reduced performance. The system operator can select the "Details" button to navigate to the graphical interfaces 402, 502. The graphical interfaces 402, 502 can provide detailed metrics on the in-home display device. The system operator can determine from the graphical interface 402 that a current energy price is not available for display at the in-home display device.

The system operator can access the graphical interface 502 to determine when data was last obtained from an intelligent metering device or other HAN gateway device 104. The HAN dashboard application 212 can determine a current time and date and a time and date for the most recent refresh of data from the intelligent metering device. In the absence of a malfunction, the latest meter data refresh may have a date and time within a specific interval of time with respect to the current time. Non-limiting examples of such time intervals include the same hour, the same three-hour period, the same day, etc. The interval of time can be configured by an operator via the HAN dashboard application 112. For example, as depicted in FIG. 5, the latest meter data refresh time is five hours before the current time.

The system operator can configure the server system 108 to transmit a control signal or message to the intelligent metering device. The control signal can direct the intelligent metering device to provide updated data to the in-home display device. The intelligent metering device can push or otherwise transmit updated data to the in-home display device. Pushing or otherwise transmitting updated data to the in-home display device can provide current pricing information to the in-home display device. The system operator can navigate to the graphical interface 302 to determine whether the malfunction has been resolved after the in-home display device is provided with a current energy price. The status of the in-home display device displayed in the graphical interface 302 can be updated by the HAN dashboard application 212 to indicate an absence of a malfunction.

Figure 6:
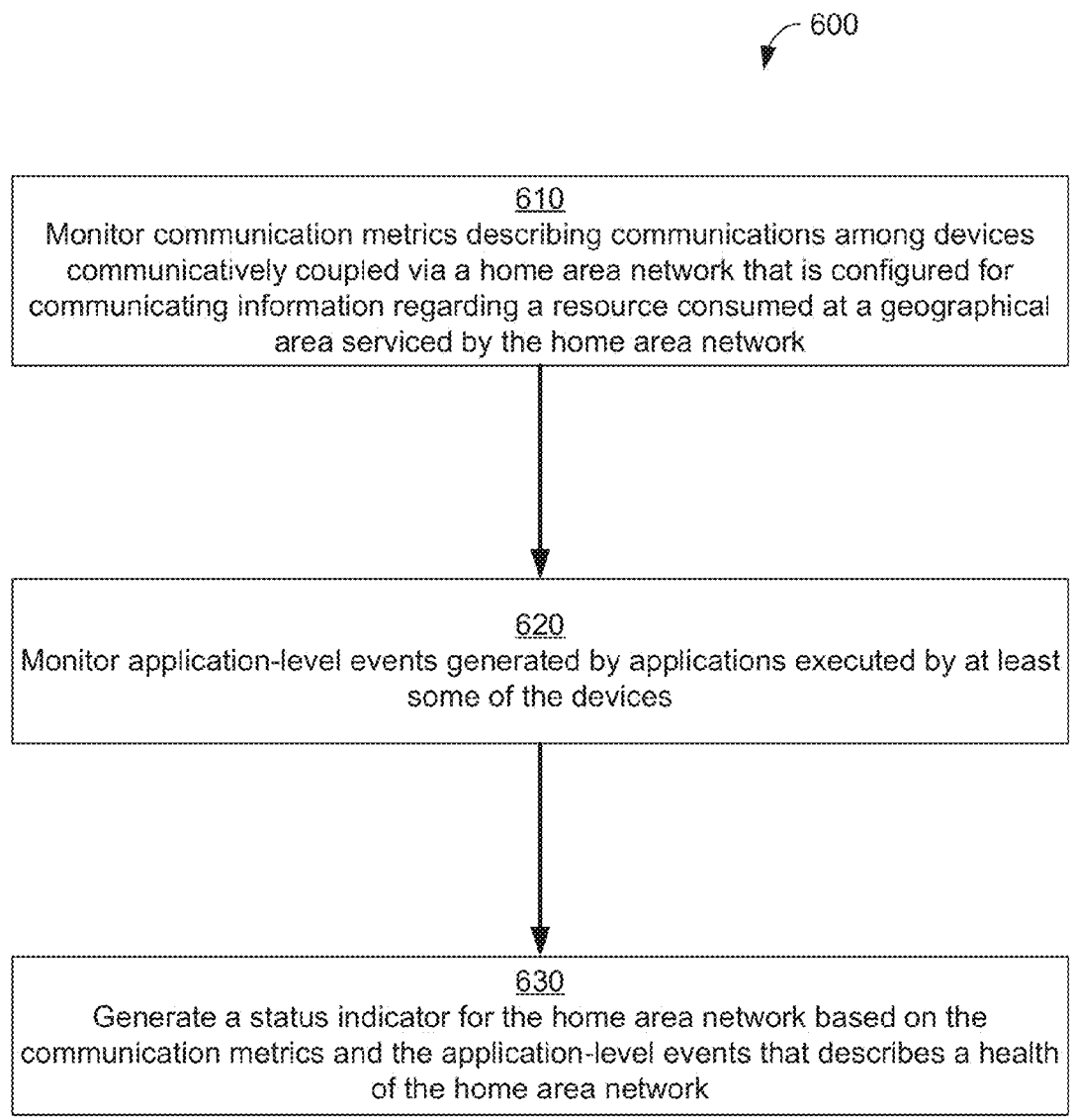
FIG. 6 is a flow chart illustrating an example method of monitoring the health of a HAN via a HAN dashboard application.

FIG. 6 is a flow chart illustrating an example method 600 of monitoring the health of a HAN 100 via a HAN dashboard application 112. For illustrative purposes, the method 600 is described with reference to the system implementations depicted in FIGS. 1-2 using the graphical interfaces depicted in FIGS. 3-5. Other implementations, however, are possible.

The method 600 involves monitoring communication metrics describing communication among devices communicatively coupled via a HAN 100, as shown in block 610. In some aspects, the processor 214 can execute the HAN monitoring application 222 to monitor, store, and/or otherwise obtain metrics regarding communication between HAN client devices 104a, 104b.

The method 600 further involves monitoring application-level events generated by applications respectively executed by at least some devices, as shown in block 620. In some aspects, the processor 214 can execute the HAN monitoring application 222 to monitor, store, and/or otherwise obtain data regarding events generated by applications executed at the HAN client devices 104a, 104b.

In some aspects, the communication among the HAN client devices 102a, 102b and the HAN gateway device 104 can include data regarding a resource provided to a geographical area serviced by the HAN 100, such as (but not limited to) power provided by a power distribution network to a dwelling serviced by the HAN 100. The status indicator for the HAN 100 can include or otherwise describe one or more attributes associated with a consumption of the resource. Non-limiting examples of attributes associated with a consumption of the resource include the consumption of the resource by one or more devices communicatively coupled to the HAN 100, managing of the resource consumption by one or more devices (e.g., via a programmable thermostat accessible via the HAN 100), monitoring the resource consumption by one or more devices (e.g., via a HAN gateway device 104), displaying information related to the resource consumption by one or more devices (e.g., via an in-home display device accessible via the HAN 100), and the like.

The method 600 further involves generating a status indicator describing a health of the HAN 100 based on the communication metrics and the application-level events, as shown in block 630. In some aspects, the processor 214 can execute the HAN monitoring application 222 to generate the status indicator based on metrics obtained by the HAN monitoring application 222 and stored in the memory 216. In additional or alternative aspects, the processor 224 can execute the HAN management application 232 to generate the status indicator based on communication metrics and application-level events monitored by the HAN monitoring application 222 and communicated to the HAN management application 232 via one or more data networks 232.

In some aspects, the status indicator can describe a health for the entire HAN 100. For example, a "home view" in a graphical interface provided by the HAN dashboard application 212 can provide a status indicator describing the overall health of the HAN 100. In other aspects, the status indicator can include a respective status indicator for each of the devices that are communicatively coupled via the HAN 100. A status indicator for a HAN 100 that is related to power distribution can include status indicators for devices such as (but not limited to) an intelligent metering device or other HAN gateway device 104 that is configured to manage and/or otherwise monitor power consumption, an in-home display device configured to display information related to power consumption, and/or a device configured to consume power to perform one or more mechanical functions or other functions in addition to analyzing, monitoring, displaying, or otherwise using data communicated via the HAN, such as (but not limited to) a pool pump or air conditioner.

In additional or alternative aspects, the status indicator can be provided to a user via one or more other graphical interfaces 302, 402, 502 described above with respect to FIGS. 3-5. The graphical interfaces 302, 402, 502 can allow a system operator to perform remote monitoring and/or management of one or more of the HAN client devices 102a, 102b.

A status indicator for the HAN 100, one or more devices communicating via the HAN 100, and/or other aspects of the HAN 100 can be generated via any suitable process.

A non-limiting example of a suitable process for generating such a status indicator can include configuring threshold quantitative measurements corresponding for one or more attributes of the HAN 100. For example, communication metrics can include quantifiable measurements such as a number of messages transmitted without associated media access control ("MAC") layer retries, a number of messages transmitted without associated application support ("APS") sub-layer retries, a number of successful APS unicast broadcasts, a number of successful APS unicast broadcasts, etc. A percentage can be calculated for the attribute based on the actual number of quantitative measurements and the threshold number of quantitative measurements. Different threshold percentages can be configured to correspond to respective status indicators (e.g., Green>95%, 75%<Yellow≤95%, 50%<Orange≤75%, 0%<Red≤50%).

Another non-limiting example of a suitable process for generating such a status indicator can include aggregating performance measurements for multiple attributes to generate an aggregate metric corresponding to a status indicator for the HAN 100 and/or one or more of devices of the HAN 100. An aggregate metric can be determined using a weight assigned to each attribute, a contribution to the aggregate metric based on the weight, and a formula or function for aggregating the contributions. One or more of the thresholds, weights, and/or formula for determining individual performance measurements and/or contributions to an aggregate device metric or HAN metric can be configurable by a user. A non-limiting example of such a formula or function is a summation of the contributions from each attribute used to determine a status indicator.

For example, as depicted in FIG. 7, a status indicator for the HAN 100 can be generated based on aggregating performance measurements for attributes such as the number of messages transmitted without associated MAC layer retries, the number of messages transmitted without associated APS sub-layer retries, the number of successful APS unicast broadcasts, and the number of successful APS unicast broadcasts. A contribution of each attribute can be determined based on a respective performance measurement for the attribute and a weight applied to the attribute. For example, as depicted in FIG. 7, a weighting of 25% is applied to each of the number of messages transmitted without associated MAC layer retries, the number of messages transmitted without associated APS sub-layer retries, the number of successful APS unicast broadcasts, and the number of successful APS unicast broadcasts. A respective performance measurement of 100% is determined for each of the attributes. An aggregate metric is generated from the sum of the contributions to the aggregate metric, wherein each contribution is determined from the formula:

Contribution=Performance metric×weight

Different threshold percentages can be configured to correspond to respective status indicators (e.g., Green>95%, 75%<Yellow≤95%, 50%<Orange≤75%, 0%<Red≤50%). A HAN status indicator indicating a "Green" status can be generated based on the aggregate metric exceeding the 95% threshold.

In another example, a status indicator for one or more of the HAN client devices 102a, 102b can be generated based on aggregating respective performance measurements for multiple attributes of the HAN client device. For example, as depicted in FIG. 8, performance measurements can be determined or otherwise obtained for a percentage of load control participation, a percentage of key establishment success, a percentage of successfully decrypted APS messages, a percentage of valid data readings from an intelligent metering device or other HAN gateway device 104, and a time of the last data poll.

For a time of the last data poll and/or other attributes determined based on timing of an event, a performance measurement of "100%" can be determined or otherwise obtained for cases in which the time of the event is more recent than a threshold time (e.g., a number of minutes, hours, days, etc.). A performance measurement of "0%" can be determined or otherwise obtained for cases in which the time of the event is less recent than a threshold event time. Multiple threshold event times corresponding to different performance can additionally or alternatively be used to determine intermediate threshold measurements (e.g., "50%", "75%", etc.).

As depicted in FIG. 8, each attribute of the given HAN client device has an associated weight of 25%. The percentage of load control participation is 85%. The percentage of key establishment success is 100%. Percentage of successfully decrypted APS messages is 100%. The percentage of valid data readings from an intelligent metering device or other HAN gateway device 104 is 85%. A time of the last data poll has a performance measurement of 100% based on the last data poll occurring more recently than a threshold event time. An aggregate metric is generated from the sum of the contributions to the aggregate metric for the device, wherein each contribution is determined from the formula:

Contribution=Performance metric×weight

A device status indicator indicating a "Yellow" status can be generated based on the aggregate metric exceeding the 75% threshold and falling short of the 95% threshold.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared, or otherwise manipulated. It has proven convenient at times, principally for reasons of common usage, to refer to such signals as bits, data, values, elements, symbols, characters, terms, numbers, numerals, or the like. It should be understood, however, that all of these and similar terms are to be associated with appropriate physical quantities and are merely convenient labels. Unless specifically stated otherwise, it is appreciated that throughout this specification, discussions utilizing terms such as "processing," "computing," "calculating," "determining," and "identifying" or the like refer to actions or processes of a computing device, such as one or more computers or a similar electronic computing device or devices, that manipulates or transforms data represented as physical electronic or magnetic quantities within memories, registers, or other storage devices, transmission devices, or display devices of the computing platform.

The system or systems discussed herein are not limited to any particular hardware architecture or configuration. A computing device can include any suitable arrangement of components that provide a result conditioned on one or more function calls. Suitable computing devices include multipurpose microprocessor-based computer systems accessing stored software that programs or configures the computing system from a general-purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied; for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that those skilled in the art, upon attaining an understanding of the foregoing, may readily produce alterations to, variations of, and equivalents to such aspects. Accordingly, it should be understood that the present disclosure has been presented for purposes of example rather than limitation and does not preclude inclusion of such modifications, variations, and/or additions to the present subject matter as would be readily apparent to one of ordinary skill in the art.

The invention claimed is:

1. A method executed by a processor, the method comprising:
   monitoring a plurality of communication metrics describing a plurality of communications among a plurality of devices communicatively coupled via a home area network, wherein the home area network is configured for communicating information regarding a resource consumed at a geographical area serviced by the home area network;
   monitoring a plurality of application-level events generated by a plurality of applications respectively executed by at least some of the plurality of devices; and
   generating a status indicator for the home area network based on the plurality of communication metrics and the plurality of application-level events, wherein the status indicator describes a health of the home area network, wherein generating the status indicator comprises:
      assigning first weights to respective types of the communication metrics, wherein the types of communication metrics comprise at least three of:
         statuses of connections from the plurality of devices to the home area network,
         a number of messages communicated via the home area network,
         a number of unicast retries communicated via the home area network,
         a number of unicast failures for the home area network, or
         a number of authentication failures for the plurality of devices;
      determining contributions of the types of communication metrics based on the monitored communication metrics and the first weights for types of communication metrics;
      assigning second weights to respective types of the application-level events, wherein the types of application-level events comprise at least two of:
         most recent times of usage for the plurality of devices,
         pricing information for the resource consumed at the geographical area,
         times of responses to load control actions by the plurality of devices,
         consumption of the resource recorded by at least some of the plurality of devices, or
         times at which at least some of the plurality of devices have refreshed data related to consumption of the resource;
      determining contributions of the types of application-level events based on the monitored application-level events and the second weights for the types of application-level events; and
      generating the status indicator based on the contributions from the types of the communication metrics and the contributions from the types of application-level events.

2. The method of claim 1,
   wherein the plurality of communication metrics comprise measurements of messages historically communicated via the home area network and describe an historic reliability of communication among the plurality of devices in the home area network;
   wherein the plurality of application-level events describe operations for monitoring the consumption of the resource and are generated by a subset of the devices monitoring the consumption of the resource in the geographical area;
   wherein the status indicator for the home area network comprises at least one attribute associated with a consumption of the resource in the geographical area, wherein the health of the home area network comprises a degree to which the plurality of devices are collectively and accurately monitoring the consumption of the resource and communicating with one another.

3. The method of claim 2,
   wherein the resource provided to the geographical area comprises power;
   wherein a first device of the plurality of devices is configured to execute a monitoring application for monitoring or managing a consumption of power in the geographical area;
   wherein a second device of the plurality of devices is configured to execute a display application for displaying information regarding the consumption of power in the geographical area;
   wherein the status indicator for the home area network comprises:
      a first indicator of effectiveness for application-level events generated by the first device monitoring or managing the consumption of power in the geographical area;
      a second indicator of effectiveness for application-level events generated by the second device accurately displaying the information regarding the consumption of power in the geographical area; and
      a third indicator of effectiveness regarding a reliability of communication via the home area network between the first device and the second device.

4. The method of claim 2, wherein the plurality of communication metrics comprises at least one of:
   a respective connection state for each of the plurality of devices;
   a number of broadcast messages communicated via the home area network;
   a number of unicast messages communicated via the home area network;
   the number of unicast retries communicated via the home area network;
   the number of unicast failures for the home area network; or
   the number of authentication failures.

5. The method of claim 1, further comprising generating a graphical interface depicting the status indicator for the home area network.

6. The method of claim 5, further comprising:
   providing the graphical interface for display at a computing device accessible via at least one of the home area network and a data network separate from the home area network, wherein the graphical interface comprises a respective device-level indicator for each device, wherein the respective device-level indicator identifies a contribution of the device to the status indicator for the home area network.

7. The method of claim 5, wherein the graphical interface is further configured to provide a respective device profile for each device, wherein the respective device profile identifies at least one hardware characteristic of the device and at least one software characteristic for software executed at the device.

8. A system comprising:
a plurality of devices communicatively coupled via a home area network, wherein the home area network is configured for communicating information regarding a resource consumed at a geographical area serviced by the home area network; and
a gateway device communicatively coupled to the plurality of devices via the home area network, the gateway device comprising:
a processor, and
a non-transitory computer-readable medium,
wherein the processor is configured for executing instructions embodied in the non-transitory computer-readable medium to perform operations comprising:
monitoring a plurality of communication metrics describing a plurality of communications among the plurality of devices via the home area network;
monitoring a plurality of application-level events generated by a plurality of applications respectively executed by at least some of the plurality of devices; and
generating a status indicator for the home area network based on the plurality of communication metrics and the plurality of application-level events, wherein the status indicator describes a health of the home area network,
wherein generating the status indicator comprises:
assigning first weights to respective types of the communication metrics, wherein the types of communication metrics comprise at least three of:
statuses of connections from the plurality of devices to the home area network,
a number of messages communicated via the home area network,
a number of unicast retries communicated via the home area network,
a number of unicast failures for the home area network, or
a number of authentication failures for the plurality of devices;
determining contributions of the types of communication metrics based on the monitored communication metrics and the first weights for types of communication metrics:
assigning second weights to respective types of the application-level events, wherein the types of application-level events comprise at least two of:
most recent times of usage for the plurality of devices,
pricing information for the resource consumed at the geographical area,
times of responses to load control actions by the plurality of devices,
consumption of the resource recorded by at least some of the plurality of devices, or
times at which at least some of the plurality of devices have refreshed data related to consumption of the resource;
determining contributions of the types of application-level events based on the monitored application-level events and the second weights for the types of application-level events; and
generating the status indicator based on the contributions from the types of the communication metrics and the contributions from the types of application-level events.

9. The system of claim 8,
further comprising a server system in communication with the gateway device via a data network, wherein the data network is separate from the home area network;
wherein the server system comprises:
an additional processor, and
an additional non-transitory computer-readable medium,
wherein the additional processor is configured for executing instructions embodied in the additional non-transitory computer-readable medium to perform additional operations comprising:
receiving the status indicator for the home area network,
based on the status indicator, identifying one of the plurality of devices causing a malfunction for the home area network,
generating a control signal directing the gateway device to perform an operation resolving the malfunction, and
transmitting the control signal to the gateway device via the data network.

10. The system of claim 8,
wherein the plurality of communications among the plurality of devices via the home area network comprises data regarding a resource provided to a geographical area in which the system is positioned;
wherein the status indicator for the home area network comprises at least one attribute associated with a consumption of the resource in the geographical area.

11. The system of claim 10,
wherein the resource provided to the geographical area comprises power provided to the geographic area;
wherein the processor of the gateway device is further configured for executing a monitoring application stored in the non-transitory computer-readable medium to monitor or manage a consumption of power in the geographical area;
wherein a display device of the plurality of devices is configured to display information regarding the consumption of power in the geographical area;
wherein the status indicator for the home area network comprises:
a first indicator of effectiveness for application-level events generated by the gateway device monitoring or managing the consumption of power in the geographical area;
a second indicator of effectiveness for application-level events generated by the display device accurately displaying the information regarding the consumption of power in the geographical area; and
a third indicator of effectiveness regarding a reliability of communication via the home area network between the gateway device and the display device.

12. The system of claim 8,
further comprising a terminal device communicatively coupled to the gateway device via at least one of the home area network and a data network separate from the home area network;
wherein the terminal device comprises:
an additional processor, and
an additional non-transitory computer-readable medium,
wherein the additional processor is configured for executing instructions embodied in the additional non-transitory computer-readable medium to perform additional operations comprising:

obtaining the status indicator for the home area network from the gateway device, and providing a graphical interface depicting the status indicator for the home area network.

13. The system of claim 12, wherein the status indicator as depicted in the graphical interface comprises a respective device-level indicator for each device of the plurality of devices, wherein the respective device-level indicator identifies a contribution of the device to the status indicator for the home area network.

14. The system of claim 12, wherein the additional processor of the terminal device is further configured to provide an additional graphical interface comprising a respective device profile for each device, wherein the respective device profile identifies at least one hardware characteristic of the device and at least one software characteristic for software executed at the device.

15. A computing system comprising:
a processor, and
a non-transitory computer-readable medium,
wherein the processor is configured for executing instructions embodied in the non-transitory computer-readable medium to perform operations comprising:
monitoring a plurality of communication metrics describing a plurality of communications among a plurality of devices via a home area network, wherein the home area network is configured for communicating information regarding a resource consumed at a geographical area serviced by the home area network;
monitoring a plurality of application-level events generated by a plurality of applications respectively executed by at least some of the plurality of devices; and
generating a status indicator for the home area network based on the plurality of communication metrics and the plurality of application-level events, wherein the status indicator describes a health of the home area network,
wherein generating the status indicator comprises:
assigning first weights to respective types of the communication metrics, wherein the types of communication metrics comprise at least three of:
statuses of connections from the plurality of devices to the home area network,
a number of messages communicated via the home area network,
a number of unicast retries communicated via the home area network,
a number of unicast failures for the home area network, or
a number of authentication failures for the plurality of devices;
determining contributions of the types of communication metrics based on the monitored communication metrics and the first weights for types of communication metrics;
assigning second weights to respective types of the application-level events, wherein the types of application-level events comprise at least two of:
most recent times of usage for the plurality of devices,
pricing information for the resource consumed at the geographical area,
times of responses to load control actions by the plurality of devices,
consumption of the resource recorded by at least some of the plurality of devices, or
times at which at least some of the plurality of devices have refreshed data related to consumption of the resource;
determining contributions of the types of application-level events based on the monitored application-level events and the second weights for the types of application-level events; and
generating the status indicator based on the contributions from the types of the communication metrics and the contributions from the types of application-level events.

16. The computing system of claim 15,
wherein the plurality of communications among the plurality of devices via the home area network comprises data regarding a resource provided to a geographical area serviced by the home area network;
wherein the status indicator for the home area network comprises at least one attribute associated with a consumption of the resource in the geographical area.

17. The computing system of claim 16,
wherein the resource provided to the geographical area comprises power;
wherein a first device of the plurality of devices is configured to execute a monitoring application for monitoring or managing a consumption of power in the geographical area;
wherein a second device of the plurality of devices is configured to execute a display application for displaying information regarding the consumption of power in the geographical area;
wherein the status indicator for the home area network comprises:
a first indicator of effectiveness for application-level events generated by the first device monitoring or managing the consumption of power in the geographical area;
a second indicator of effectiveness for application-level events generated by the second device accurately displaying the information regarding the consumption of power in the geographical area; and
a third indicator of effectiveness regarding a reliability of communication via the home area network between the first device and the second device.

* * * * *